United States Patent Office

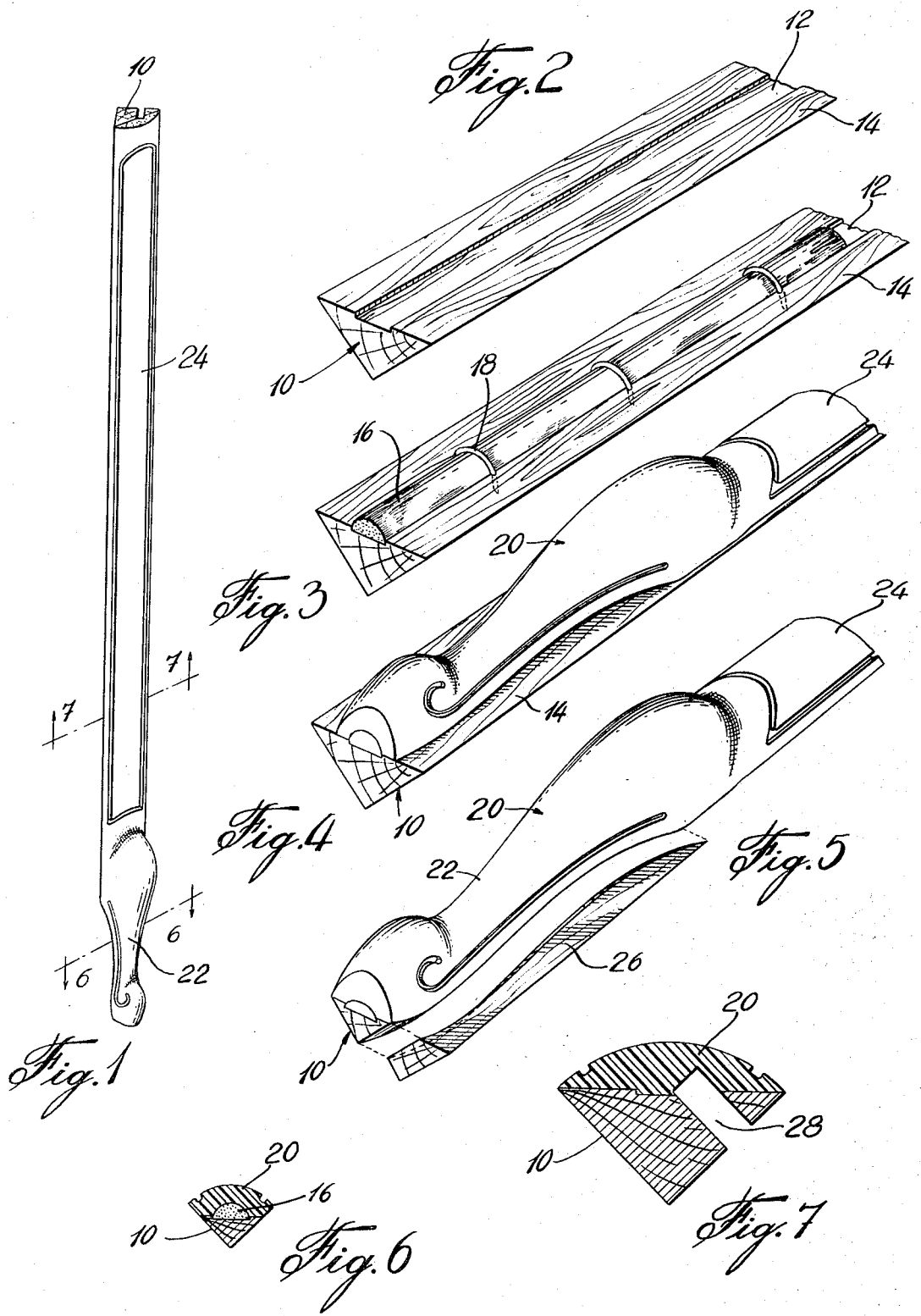

3,846,211
Patented Nov. 5, 1974

---

3,846,211
FURNITURE ELEMENT
Marcel Begin, Camille Morrissette, Pierre Beaumier, and Charles Tupinier, Victoriaville, Quebec, Canada, assignors to Victoriaville Furniture Limited, Victoriaville, Quebec, Canada
Filed Apr. 10, 1973, Ser. No. 349,705
Int. Cl. D04d 7/06
U.S. Cl. 161—7
6 Claims

ABSTRACT OF THE DISCLOSURE

There is disclosed a method of manufacturing a structural and ornamental element for use as a furniture leg or the like in which a facing of polymeric material is molded directly onto a previously reinforced wooden backing. The reinforcement may consist of a resin and glass fibre rod secured to the wooden member. A furniture element obtained by the method has the appearance of a carved wooden leg and approximately the same strength while being substantially less expensive.

---

The present invention relates to a structural and ornamental element for furniture and to a method of manufacturing it.

Structural furniture elements such as table or chair legs, corner posts for chests and cupboards and others are often elaborately carved for ornamental purposes and trimmed so that a portion thereof most frequently near the bottom of the leg or post, is laterally displaced with respect to the longitudinal extent of the rest of the leg or post. The carving operation is laborious and time consuming and the trimming affects the strength of the furniture element by reducing the cross-section of straight wood grain running all the way along the element.

It is an object of the present invention to provide a method of manufacturing a structural and ornamental element for furniture or the like which overcomes the aforementioned disadvantages.

The invention accordingly provides a method of making a structural and ornamental element for furniture or the like, comprising preparing an elongated backing support and molding a facing of plastics or ornamental configuration directly onto the support. The conventional carving step is thereby replaced by a much simpler, faster and less expensive molding step. The preparation of the backing support may be arranged to include only straight line cutting which can be done quickly and efficiently.

Further according to the invention, the step of preparing the support comprises shaping a wood member of preferably right-angled triangular cross-section and securing a reinforcing member to the hypothenuse side of the wood member, the facing being molded onto the hypothenuse side and covering the reinforcing member. The step of securing the reinforcing member can be done quickly and without regard to appearance since the reinforcing member is subsequently covered by the facing. The reinforcing member provides support at least for those parts of the leg in which the wood member is trimmed to a reduced cross-section or the reinforcing member may also be arranged to extend along the full length of the furniture element.

In accordance with the invention, trimming of the support is carried out after the molding step is completed.

Also within the scope of the invention, is a structural and ornamental element for furniture or the like produced by the above-stated method and comprising an elongated backing support and a facing of structurally weak material of ornamental configuration adhered to the support, the support comprising a wood member and a reinforcing member extending at least along portions of the wood member of reduced cross-section.

According to the invention, the reinforcing member is preferably a rod of resin and glass fibre secured to the wood member and the facing is made of polyurethane or other suitable polymeric composition.

Further according to the invention, the wood member has a right-angled triangular cross-section and the reinforcing member is connected centrally to the hypothenuse side of the wood member while the facing is located on the same hypothenuse side and covers the reinforcing member. With this arrangement, the furniture element is mounted with the facing directed outwardly and the exposed portions of the wood member constituted by the two remaining sides, are directed inwardly and relatively hidden from view.

Further according to the invention, the hypothenuse side of the wood member may present a recess wherein the reinforcing member can be received to ensure proper positioning thereof.

A preferred embodiment of the invention is illustrated by way of example in the accompanying drawings in which FIG. 1 is a perspective view of a combined leg and corner post for a chest or cupboard, FIGS. 2 to 5 are fragmentary perspective views illustrating the subsequent steps of the method of manufacturing the furniture element of FIG. 1 in accordance with the invention, FIG. 6 is a cross-section of the completed furniture element along line 6—6 of FIG. 1 and FIG. 7 is a cross-section of the completed furniture element along line 7—7 of FIG. 1.

Referring to FIGS. 2 to 5, the method according to the invention comprises as a first step, the preparation of a wood member 10 of right-angled triangular cross-section with a shallow recess 12 centrally and longitudinally disposed on the hypothenuse side 14 of wood member 10. The result of this first step is illustrated in FIG. 2. The cutting involved may be done quickly and efficiently with a circular saw and a shaper or dado cutter for the recess 12 or on more elaborate shaping machinery which cuts the profile of wood member 10 and the recess 12 in a single operation. Wood members 10 are cut to the required length on a crosscut saw.

As a next step in the process, a reinforcing member 16 which may comprise a bundle of glass fibres bound with resin and of semicircular cross-section, is inserted in recess 12 and secured to the wood member 10 by means of staples 18. The reinforcing member 16 may be of any other desired cross-section and of any suitable material. The recess 12 will preferably be shaped to fit the reinforcing member 16 but this recess 12 may also be omitted altogether and the reinforcing member 16 may be secured directly and centrally to the hypothenuse side 14 of wood member 10.

As shown in FIG. 3, the reinforcing member 16 extends only along the bottom portion of the furniture element which is subsequently trimmed as hereinafter described so as to reinforce particularly this bottom portion. The reinforcing element 16 may however extend along the full length of wood member 10.

Attachment of the reinforcing member 16 to the wood member 10, may be effected by any suitable means other than staples 18, for example, by gluing, nailing through the reinforcing member 16, or dovetailing the reinforcing member 16 and the recess 12 and assembling them by endwise sliding.

The next step in the process resulting in the element shown in FIG. 4, consists of molding a facing of ornamental configuration 20 directly onto the support consisting of the combined wood member 10 and reinforcing member 16. The molding operation is carried out in a conventional mold with an open side against which is placed the hypothenuse side 14 of the wood member 10 so that the wood member 10 completes the confined space of the mold. The mold surface may be textured to provide a simulated wood grain on the surface of the facing 20. The facing 20 covers entirely the reinforcing member 16.

The molding material for the facing is preferably polyurethane or other suitable plastics which may be tinted as desired to obtain a particular shade.

A further step in the process illustrated in FIG. 5 involves trimming away exposed or unwanted portions of the wood member 10 by means of a band saw or a shaper. In the specific embodiment shown, the portions of the wood member 10 exceeding a narrowed terminal portion of the facing 20, are cut off perpendicular to the respectively remote rear sides of the wood member 10. This operation produces a terminal leg portion 22 displaced laterally with respect to the longitudinal extent of the post portion 24. The cross-section of the leg portion 22 is reduced by a cut off piece 26 on each side and is reinforced by reinforcing member 16 to compensate for this reduction in cross-section.

It is understood that the configuration resulting from the molding step of FIG. 4 and the trimming step of FIG. 5 as illustrated therein, is merely an example and may vary widely with design requirements.

Subsequent steps such as finishing and cutting a connecting groove 28 as shown in FIG. 7, may then be carried out.

Comparison of FIGS. 6 and 7 clearly shows the reduced cross-section of wood member 10 in the leg portion 22 of the furniture elements.

We claim:

1. A structural and ornamental element for furniture or the like comprising an elongated backing support comprising a wood member and a reinforcing member extending at least along portions of said wood member of reduced cross-section and a facing of structurally weak material of ornamental configuration adhered to said support.

2. An element according to claim 1, wherein said reinforcing member is a rod of resin and glass fibre secured to said wood member.

3. An element according to claim 1, wherein said facing is of polyurethane.

4. An element according to claim 1, wherein said wood member has a right-angled triangular cross-section and said reinforcing member is connected centrally to the hypothenuse side of said wood member.

5. An element according to claim 4, wherein said facing is located on the hypothenuse side of said wood member and covers said reinforcing member.

6. An element according to claim 4, wherein said hypothenuse side of said wood member has a recess receiving said reinforcing member.

References Cited
UNITED STATES PATENTS

| | | | |
|---|---|---|---|
| 612,641 | 10/1898 | Durbar | 161—7 |
| 2,984,036 | 5/1961 | Adler, Sr. | 161—12 |
| 3,240,460 | 3/1966 | Petersen | 161—7 |
| 3,639,001 | 2/1972 | Anderson | 248—188.8 |

WILLIAM E. SCHULZ, Primary Examiner

U.S. Cl. X.R.

5—310; 248—188.8; 264—258; D6—195